United States Patent [19]

Kato et al.

[11] 4,004,162

[45] Jan. 18, 1977

[54] CLOCK SIGNAL REPRODUCING NETWORK FOR PCM SIGNAL RECEPTION

[75] Inventors: Kotaro Kato; Haruki Takai, both of Tokyo, Japan

[73] Assignee: Nippon Electric Company, Ltd., Tokyo, Japan

[22] Filed: Jan. 22, 1976

[21] Appl. No.: 651,369

[30] Foreign Application Priority Data

Jan. 25, 1975 Japan ............... 50-10171

[52] U.S. Cl. .................... 307/269; 328/63; 328/120; 331/49
[51] Int. Cl.$^2$ ......................... H03K 3/78
[58] Field of Search ............ 328/120, 61, 63; 331/49; 307/269

[56] References Cited

UNITED STATES PATENTS

| | | | |
|---|---|---|---|
| 3,289,097 | 11/1966 | Martin | 331/49 |
| 3,350,580 | 10/1967 | Harrison | 328/120 X |
| 3,593,044 | 7/1971 | McNeilly | 328/63 X |
| 3,671,776 | 6/1972 | Houston | 307/269 |
| 3,790,892 | 2/1974 | Tan et al. | 328/120 |

Primary Examiner—John S. Heyman
Attorney, Agent, or Firm—Sughrue, Rothwell, Mion, Zinn & Macpeak

[57] ABSTRACT

A clock signal reproducing network for PCM signal reception is capable of reproducing a clock signal even if the clock component is absent in the input digital signal for a prolonged period of time. The network includes a clock signal component extracting circuit and a bandpass filter for extracting and band-limiting the clock signal component in a received digital signal. An envelope detection circuit and a level decision circuit are connected to receive the output of the bandpass filter to provide a control signal to an output switching circuit. When the amplitude of the envelope of the filter output is high, the output of the bandpass filter is used directly as a reproduced clock signal. When the amplitude of the envelope is low, the clock signal obtained immediately before the filter amplitude becomes small is derived repeatedly from a delay circuit as a substituted clock signal.

5 Claims, 6 Drawing Figures

FIG.1
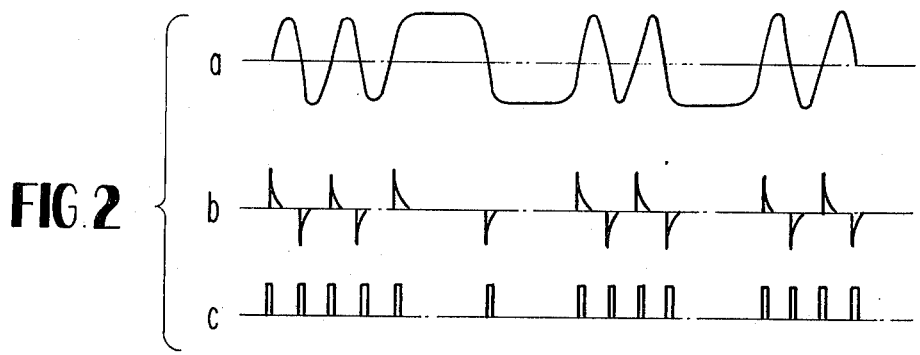
FIG.2
FIG.3
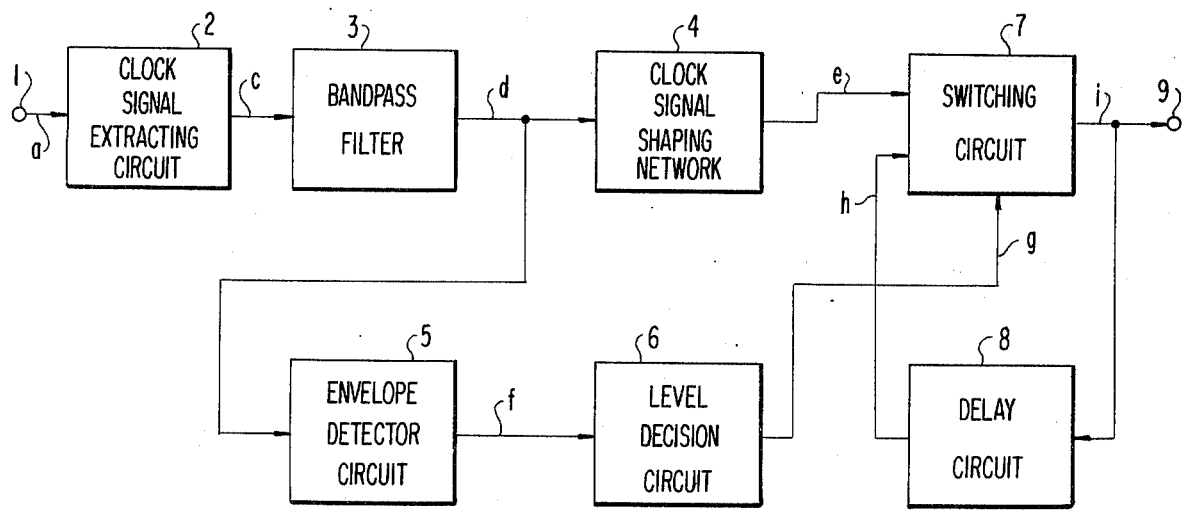

CLOCK SIGNAL REPRODUCING NETWORK FOR PCM SIGNAL RECEPTION

BACKGROUND OF THE INVENTION

The present invention relates to a network for reproducing a clock signal from the baseband digital signal demodulated at a PCM receiver.

In a PCM microwave communication system, pulse code modulated carrier waves are demodulated at the receiving end into a baseband signal. The demodulated digital signal is applied to the code converter, decoder and remodulator of the relaying transmitter or the like which follow the demodulator stage. In these circuits which follow the demodulator, the demodulated digital signal must be synchronized with a clock signal reproduced synchronously from the digital signal. Generally, the digital signal representing the information is constructed of a digital code train with marks and spaces, with the clock signal component lying in the transition between a mark and a space. In practice, the mark and the space do not always occur alternately; often, the mark or the space occurs serially. In such duration of a mark or a space, it is virtually impossible to reproduce the clock signal component from the digital signal. One solution to this problem is to use a bandpass filter of narrow bandwidth or a phase-locked oscillation circuit to make it possible to reproduce the clock signal for the duration of the pulse code train which holds no clock signal component. In the system using the bandpass filter, the narrower the bandwidth, the greater will become the delay time in response at the output. Widening the bandwidth of the filter to reduce the delay time in output response will result in increase in jitter, causing the reproduced clock signal to be ruined. While, in the system using the phase-locked oscillation circuit, it takes a considerable time to establish the synchronized state.

In a communication network in which a number of stations communicate with each other by way of a common relay medium on a time-division basis, as in the TDMA satellite communication system which is expected to be put into practical use in near future, the digital signals transmitted from the individual stations are intermittent, so-called "burst signal" and also, asynchronization is present between the individual burst signals. At the receiving end, therefore, the respective clock signals must be reproduced independently of each other for individual bursts. Furthermore, if an extra time is taken at the receiver end for the reproduction of the clock signal at the beginning of each burst, this will make it difficult to retime the received digital signal at the beginning of the burst, resulting in the reduction of the efficiency in such communication network. After all, the use of the bandpass filter of narrow bandwidth or the phase-locked oscillation circuit is not an efficient answer to the problem involved in pulse code communications based on the TDMA system.

SUMMARY OF THE INVENTION

It is therefore an object of the invention to provide a clock signal reproducing network capable of reproducing a clock signal even if the clock signal component is absent in the input digital signal for a prolonged period of time.

It is another object of the invention to provide a clock signal reproducing network capable of reproducing clock signals asynchronized with each other at each burst at the receiving end of a TDMA communication system.

As is well-know, when a digital signal containing a certain clock signal component is applied to a bandpass filter of narrow bandwidth centered on the clock frequency, the amplitude of the filter output gradually increases transiently whereby a stable clock signal is provided at the output in the form of a sinewave of the clock frequency after a sufficiently long period of time. While, if no clock signal component is present in the input of the bandpass filter, the filter output gradually decreases to make it difficult to reproduce the clock signal. These facts have led to one important ground of the invention. Specifically, the invention utilizes an envelope detection circuit connected to the output stage of the bandpass filter to detect the amplitude of the envelope of the filter output. When the amplitude thereof is high, the output of the bandpass filter is used directly as a reproduced clock signal. While, when the amplitude of the envelope is low, the clock signal obtained immediately before the filter output amplitude becomes small is derived repeatedly from a delay circuit as a substituted clock signal.

BRIEF DESCRIPTION OF THE DRAWINGS

The other objects, features and advantages of the invention will become more apparent from the following description when read in conjunction with the accompanying drawings, wherein:

FIG. 1 is a block diagram showing an example of a prior art clock signal reproducing network;

FIG. 2 is a time chart of input and output signal waveforms illustrating the operation of the clock signal component extracting circuit of FIG. 1;

FIG. 3 is a block diagram showing an embodiment of a clock signal reproducing network of the invention;

DESCRIPTION OF THE PREFERRED EMBODIMENT

Figure 4:
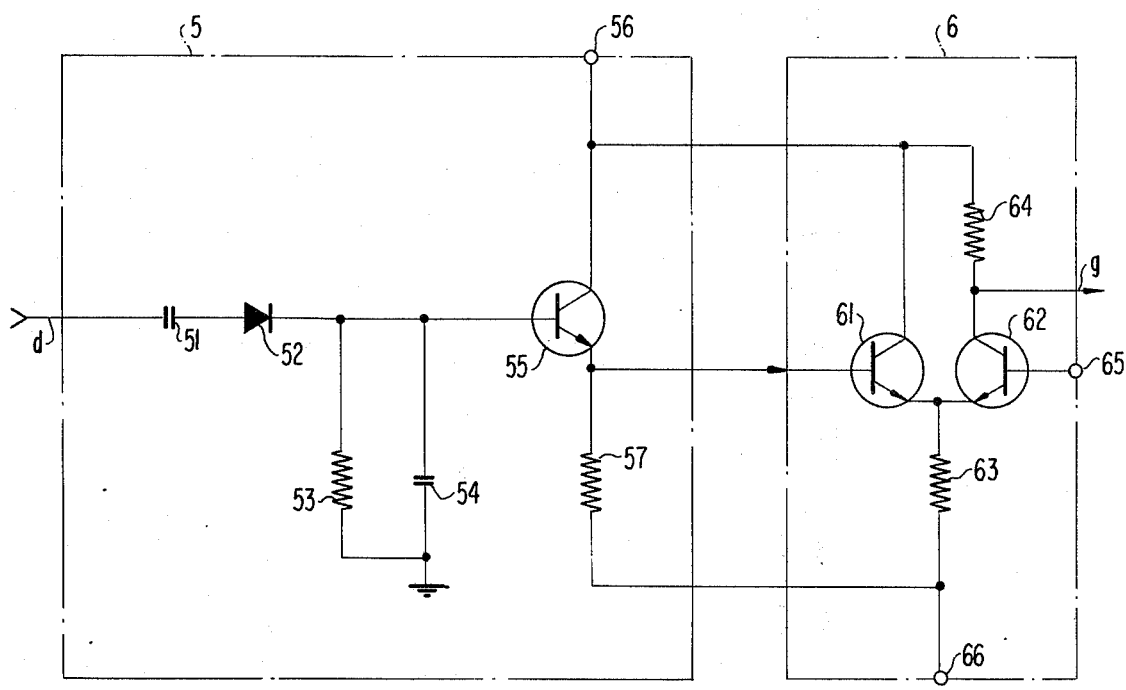
FIG. 4 is a circuit diagram showing concrete examples of an envelope detection circuit and a level decision circuit used for the circuit of FIG. 3.

In order to better understand the preferred embodiment of the invention, a brief description of a prior art clock signal reproducing network will first be made. With reference to FIG. 1, there is shown in block form a prior art clock signal reproducing network comprising a receiving digital signal input terminal 1, a clock signal component extracting circuit 2, a bandpass filter 3, and a clock signal shaping circuit 4. The clock signal component extracting circuit 2 composed of a differentiating circuit and a fullwave rectifier circuit extracts intermittently clock-synchronized pulses from the received input digital signal. These clock pulses are applied to the bandpass filter 3 of narrow bandwidth centered on the clock frequency. The output of the filter is obtained stably in the form of the sinewave of the clock frequency, even against short absence of the clock signal component on the input side because the attenuation coefficient Q of the bandpass filter 3 is high. Then, the filter output $d$ is applied to the clock signal shaping circuit 4 which is constituted of a diode limiter circuit. The shaped signal is derived at the output as a clock signal of square waveform *e*. FIG. 2 shows signal waveforms at the same timing in the circuit of FIG. 1: the waveform *a* is the input digital signal to the clock component extracting circuit 2; the waveform *b*, the differentiated signal; and the waveform *c*, the rectified signal.

This clock signal reproducing circuit operates satisfactorily as long as the input digital signal comes in continuously. If, however, the input digital signal is applied in a burst-like manner, the clock signal obtained at the output becomes intermittent and, at the beginning of burst, the clock signal is reproduced with a considerable time delay due to the high Q of the bandpass filter. Obviously, the pulse code communication system based on the TDMA system must must be free from such a problem.

The invention provides a clock signal reproducing network, which comprises a receiving digital signal input terminal 1, a clock signal component extracting circuit 2, a bandpass filter 3, and a clock signal shaping network 4 as illustrated in FIG. 3. These constituent elements are similar to those of the prior art system shown in FIG. 1. The circuit of the invention further comprises an envelope detection circuit 5, a level decision circuit 6, a switching circuit 7, a delay circuit 8, and a clock signal output terminal 9. The clock signal component *c* is obtained in the same manner as shown in the circuit of FIG. 1. The bandpass filter 3 of the invention has a relatively wider bandwidth than the conventional one in order to speed the clock signal reproduction in response to each arrival of the burst signal when signals transmitted on a time-division basis are asynchronous with each other as in the TDMA system as described previously. Therefore, the bandpass filter 3 is capable of offering an output *d* with a relatively stable clock frequency, which has quick response to the burst signal. If, however, the input digital signal is lacking in the clock signal component for a prolonged period, the output *d* of the bandpass filter attenuates at a rate comparable to time period the clock signal component is absent, with the result that no substantial clock information is available.

The output *d* of the bandpass filter is branched to two; one goes to the clock signal shaping circuit 4 which, for example, is constituted of a diode limiter in the known manner. The shaped, squared waveform signal *e* is applied to one input of the switching circuit 7. The other branched component from bandpass filter 3 goes to the envelope detection circuit 5, which in turn detects the envelope output *f*. If the clock signal component is absent from the input digital signal for a prolonged period, the envelope output *f* will attenuate. The level of the output *f* is compared with a predetermined DC level by the level decision circuit 6, and the decided result is available at the output *g* of the level decision circuit 6. This output *g* goes to the switching circuit 7, thereby controlling the switching of the circuit 7.

The output *e* of the clock signal shaping circuit 4 goes to one input terminal of the switching circuit 7, and the output *i* of the switching circuit 7 goes to the output terminal 9 as a reproduced clock signal, as well as to the input terminal of the delay circuit 8 which provides a given delay. The input of the delay circuit 8 is thus delayed accurately by a predetermined time. The delay circuit 8 can readily be realized, for example, with a delay line in the known manner. The output *h* of the delay circuit 8 is applied to the other input terminal of the switching circuit 7. The switching circuit 7 is controlled so that when the output *g* of the level decision circuit 6 indicates that the level of the output *f* of the envelope detection circuit is higher than a predetermined DC level, one input of the switching circuit 7, i.e., the output *e* of the clock signal shaping circuit 4 is led directly to the output terminal 9 of the switching circuit 7; while, when the level of output *g* is lower than the predetermined DC level, the output *h* of the delay circuit is led to the output terminal 9 of the switching circuit 7.

Figure 5:
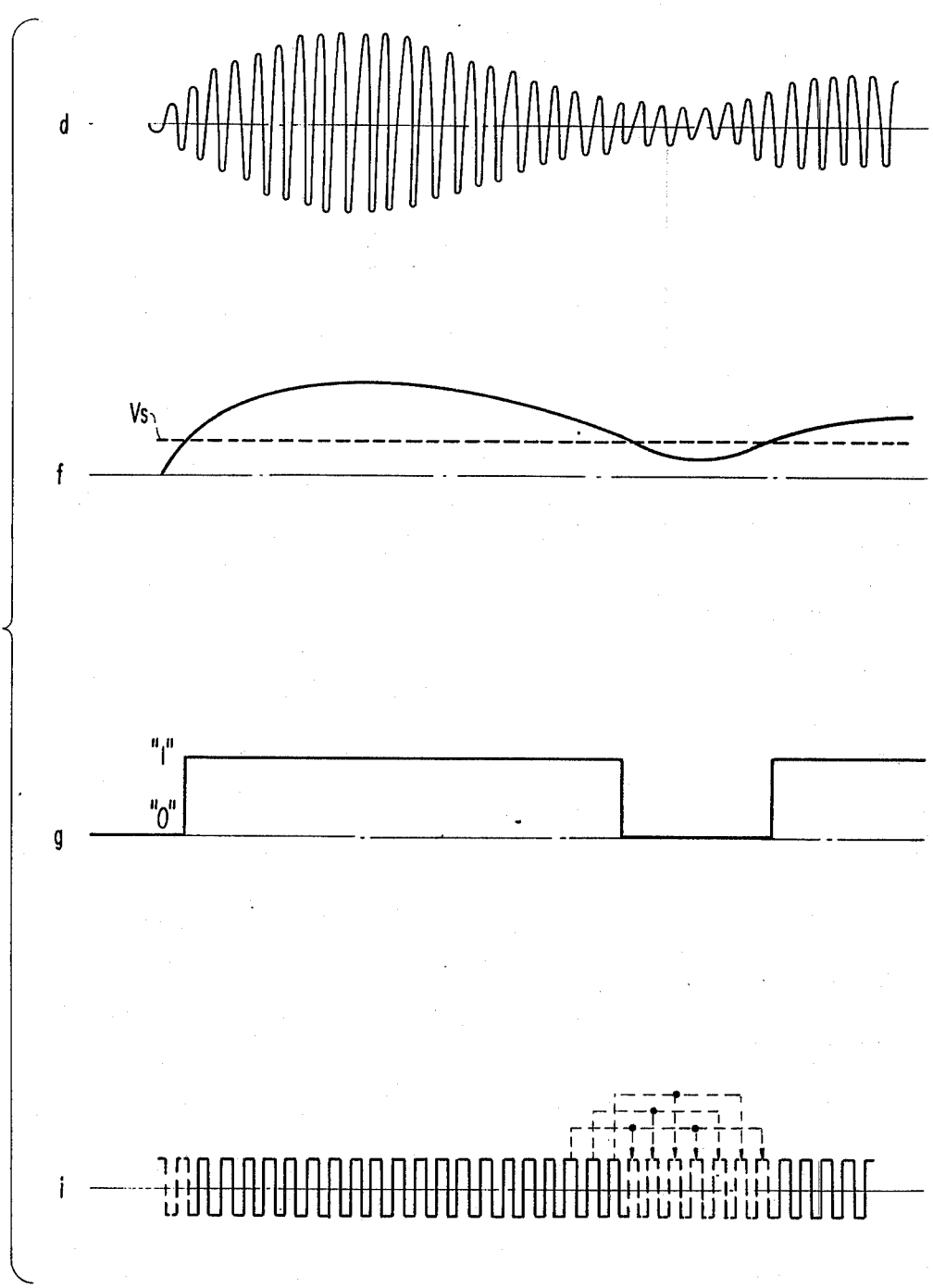
FIG. 5 is a time chart illustrating the operation of the clock signal reproducing network of the invention.

With reference to FIG. 4, there is shown a circuit diagram illustrating a specific example of the envelope detection circuit 5 and level decision circuit 6 which provides the signal *g* for controlling the switching circuit 7. The output *d* of the bandpass filter 3 is applied to a capacitor 51 of the envelope detection circuit 5 whereby the DC component is removed from the output *d*. The resultant signal is applied to a diode 52. When the input of the diode 52 stands at a potential higher than its output level, a charging current flows in a capacitor 54 by way of the diode 52. While, when the input of the diode 52 stands at a potential lower than its output level, no current flows in the diode 52, and the capacitor 54 discharges through a resistor 53. The capacitor 54 and resistor 53 constitute a low-pass filter. When the capacitor 54 is charged in response to the frequency of the output *d* of the bandpass filter 3, and also, its discharging through the resistor 53 is made at a time constant greater than one cycle of the frequency of the output *d*, the base input of a transistor 55 serves as the envelope of the output *d*. An emitter follower comprising a transistor 55 and a resistor 57 connected to the emitter of transistor 55 receives a positive DC voltage at the collector of transistor 55 from a terminal 56, and a negative DC voltage at resistor 57 from a terminal 66, thereby providing an envelope-detected output *f* at the emitter of transistor 55. The level decision circuit 6 is constituted of a differential amplifier circuit having transistors 61, 62, and resistors 63 and 64. A positive DC voltage is connected to the collector to transistor 61 and the load resistor 64 from terminal 56, and a negative DC voltage is connected to the common emitter resistor 63 from the terminal 66. In this circuit, the output *f* of the envelope detection circuit 5 is applied to the base of the transistor 61, and also, a level deciding reference voltage Vs is applied to the base of the transistor 62 through a terminal 65. When the voltage of the envelope detection output f is higher than the reference voltage Vs, the level of logic 1 can be obtained at the collector of the transistor 62 as the output *g* of the level decision circuit by suitably selecting the values of resistors 63 and 64. While, when the voltage of the envelope detection output *f* is lower than the reference voltage Vs, the level of logic 0 is obtained. FIG. 5 shows waveforms of signals appearing at the input and output terminals of the envelope detection circuit 5 and level decision circuit 6, wherein the waveform *d* is the output of the bandpass filter 3 which appears in a pulsating form, the waveform *f* is the output of the envelope detection circuit which indicates the envelope of the pulsating signal, and also the waveform *g* is the control output signal of the level decision circuit 6, which is formed by level comparison of the envelope with the reference voltage Vs.

Figure 6:
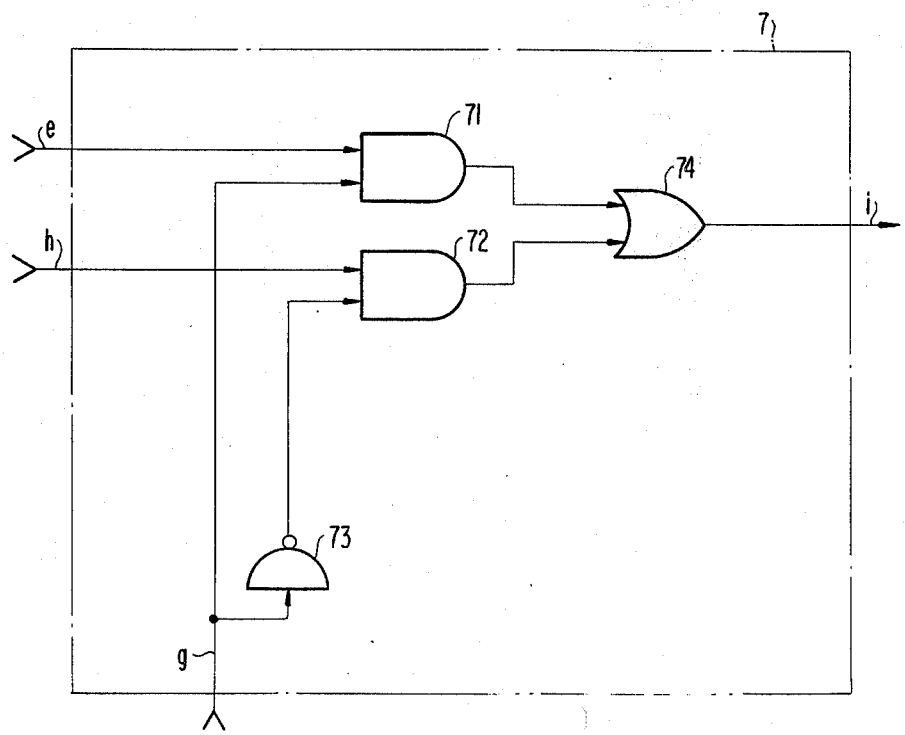
FIG. 6 is a circuit diagram showing a concrete example of switching circuit used for the circuit of FIG. 3.

A specific example of the switching circuit 7 will be described below by referring to FIG. 6. The switching circuit 7 consists essentially of AND gates 71 and 72, an OR gate 74, and an inverter 73. The output e of the clock signal shaping circuit 4 is applied as a first input to one input terminal of the AND gate 71, and the output h of the delay circuit 8 is applied as a second input to one input terminal of the AND gate 72. The control signal g, i.e., the output of the level decision circuit 6, is applied to the other input terminal of the AND gate 71, and to the other input terminal of the AND gate 72 through the inverter 73. The control signal g to the switching circuit 7 assumes the logic 1 when the level of the output f of the envelope detection circuit 5 is higher than a predetermined DC level, or the logic 0 when the level thereof is lower than the predetermined DC level. Hence, the output of the inverter 73 assumes the logic 1 when the envelope detection output f stands at a level lower than the predetermined DC level, or the logic 0 when it is higher than the predetermined DC level. Because the AND gate 71 is controlled by the output g of the level decision circuit, the output e of the clock signal shaping circuit 4 is led to the output terminal of the AND gate 71 only while the output g of the level decision circuit assumes the logic 1, i.e., while the output d of the bandpass filter 3 has sufficient clock signal level. At the AND gate 72, the output h of the delay circuit is inhibited because the output of the inverter 73 goes to the logic 0 and thus the output e can be derived from the clock signal shaping circuit as the output i of the OR gate 74. The output h of the delay circuit 8 is led to the output terminal of the AND gate 72 only while the output g of the level decision circuit assumes the logic 0, i.e., while the output d of the bandpass filter has no sufficient clock signal level. The output of the AND gate 72 is led to the output side of the switching circuit 7 by the OR gate 74. At the output of the switching circuit 7, therefore, a good clock signal is available recurrently through the delay circuit even if the clock signal component is absent from the input digital signal for a prolonged period.

In the embodiment shown in FIG. 3, the length of delay provided by the delay circuit is determined accurately to coincide with N bit-length (N: a positive integer preferrably larger than 1) the times interval during which the output h of the delay circuit 8 is fed back to the switching circuit 7 by way of the AND gate 72, OR gate 74 and delay circuit 8. Assuming that N = 1, when the switching circuit 7 is switched to the side of the delay circuit as a result of the decision by the level decision circuit 6 that the output f of the envelope detection circuit 5 stands at a level lower than the predetermined DC level, the clock pulse obtained immediately before the switching is derived recurrently at the output terminal 9 as a substituted clock pulse, at a rate of every one bit, through the delay circuit 8. Also, the length of delay by the delay circuit 8 may be determined as indicated by the symbol i in FIG. 5 to make available in succession three clock pulses (N = 3) obtained immediately before the switching. In the above operation, an amplifier circuit must be inserted into, before or after the delay circuit in order to prevent the recurring signal from being attenuated.

According to the invention, as has been described above, the clock signal can be successively reproduced even if the clock signal component is absent from the input digital signal for a prolonged period. Hence, the clock signal reproducing circuit of the invention is highly suited not only for the TDMA communication system but also for general pulse code communication system.

What is claimed is:
1. A clock signal reproducing network for PCM signal reception comprising:
   a clock signal component extracting circuit for extracting the clock signal component from a received digital signal in a baseband;
   a bandpass filter connected to the output of said clock signal component extracting circuit for band-limiting the output thereof to derive a sine wave signal of the clock frequency;
   a clock shaping circuit connected to the output of said bandpass filter for shaping said sine wave signal into a square wave signal;
   an envelope detection circuit connected to the output of said bandpass filter for detecting the envelope of the output of said bandpass filter;
   a level decision circuit connected to the output of said envelope detection circuit for comparing the output level of said envelope detection circuit with a reference level;
   a switching circuit having first and second input terminals, one of the first and second inputs being selectively switched to an output terminal; and
   a delay circuit connected to said output terminal for delaying the output of said switching circuit;
   wherein the output of said clock shaping circuit is applied to the first input terminal of said switching circuit, the output of said delay circuit is applied to the second input terminal of said switching circuit, and said switching circuit is controlled by the output of said level decision circuit so that the first or second input is selectively led to the output terminal.

2. The clock signal reproducing network as recited in claim 1, wherein said envelope detector comprises:
   rectifier means connected to receive the output of said bandpass filter;
   a low pass filter connected to said rectifier means and having a time constant greater than one cycle of said clock frequency; and
   an emitter follower connected to the output of said low pass filter.

3. The clock signal reproducing network as recited in claim 1, wherein said level decision circuit comprises:
   first and second transistors having their emitters connected in common, the output of said envelope detector being connected to the base of said first transistor and a reference voltage source being connected to the base of said second transistor;
   a first resistor connected between the common connection of the emitters of said first and second transistors and a first source of supply voltage; and
   a second resistor connected between the collector of said second transistor and a second source of supply voltage, the collector of said first transistor being directly connected to said second source of supply voltage and the output of said level decision circuit being taken from the collector of said second transistor, the values of said first and second resistors being selected so that said level decision circuit provides a first constant level output when the output of said envelope detector is greater than said reference level and a second constant level output when the output of said envelope detector is less than said reference level.

4. The clock signal reproducing network as recited in claim 1, wherein said switching circuit comprises:
- a first AND gate connected to receive the output of said clock shaping circuit and gated by the output of said level decision circuit;
- a second AND gate connected to receive the output of said delay circuit and gated by the inverse of the output of said level decision circuit; and
- an OR gate connected to receive the output of said first and second AND gates to provide a clock signal output.

5. The clock signal reproducing network as recited in claim 1, wherein said envelope detector, said level decision circuit and said switching circuit comprises in combination:
- rectifier means connected to receive the output of said bandpass filter;
- a low pass filter connected to said rectifier means and having a time constant greater than one cycle of said clock frequency;
- an emitter follower connected to the output of said low pass filter;
- first and second transistors having their emitters connected in common, the output of said envelope detector being connected to the base of said first transistor and a reference voltage source being connected to the base of said second transistor;
- a first resistor connected between the common connection of the emitters of said first and second transistors and a first source of supply voltage;
- a second resistor connected between the collector of said second transistor and a second source of supply voltage, the collector of said first transistor being directly connected to said second source of supply voltage and the output of said level decision circuit being taken from the collector of said second transistor, the values of said first and second resistors being selected so that said level decision circuit provides a first constant level output when the output of said envelope detector is greater than said reference level and a second constant level output when the output of said envelope detector is less than said reference level;
- a first AND gate connected to receive the output of said clock shaping circuit and gated by the output of said level decision circuit;
- a second AND gate connected to receive the output of said delay circuit and gated by the inverse of the output of said level decision circuit; and
- an OR gate connected to receive the output of said first and second AND gates to provide a clock signal output.

* * * * *